United States Patent
Ohtani et al.

(10) Patent No.: US 6,884,363 B2
(45) Date of Patent: Apr. 26, 2005

(54) METHOD OF SURFACE TREATMENT FOR STAINLESS STEEL PRODUCT FOR FUEL CELL

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 110 days.

(21) Appl. No.: 10/169,791

(22) PCT Filed: Nov. 6, 2001

(86) PCT No.: PCT/JP01/09686

§ 371 (c)(1),
(2), (4) Date: Nov. 8, 2002

(87) PCT Pub. No.: WO02/38828

PCT Pub. Date: May 10, 2002

(65) Prior Publication Data

US 2003/0116536 A1 Jun. 26, 2003

(30) Foreign Application Priority Data

Nov. 10, 2000 (JP) ..................................... 2000-343819

(51) Int. Cl.[7] .................................................. C25F 3/06
(52) U.S. Cl. ............................. 216/6; 216/13; 216/100; 216/108; 427/115; 134/3; 148/240; 148/280
(58) Field of Search ............................. 216/6, 13, 100, 216/108; 427/115; 134/3; 148/240, 280

(56) References Cited

U.S. PATENT DOCUMENTS 5,049,221 A * 9/1991 Wada et al. ................ 156/151
5,981,081 A * 11/1999 Sue ............................. 428/564
6,329,099 B1 * 12/2001 Oyama et al. .............. 429/104
6,379,476 B1 * 4/2002 Tarutani et al. ............. 148/325
6,444,304 B1 * 9/2002 Hisamoto et al. ........ 428/319.1

FOREIGN PATENT DOCUMENTS

| EP | 1 046 723 A1 | 10/2000 |
| WO | WO 82/03231 A1 | 9/1982 |
| WO | WO 99/41795 A1 | 8/1999 |

OTHER PUBLICATIONS

International Search Report.
Patent Abstracts of Japan. JP 2000–277133 Oct. 6, 2000.
Patent Abstracts of Japan. JP 2000–303151. Oct. 31, 2000.

* cited by examiner

Primary Examiner—Allan Olsen
(74) Attorney, Agent, or Firm—Sughrue Mion, PLLC

(57) ABSTRACT

A method for treating the surface of a stainless steel product for a fuel cell containing, in wt %, 0.15% or less of C, 17 to 36% of Cr, 0.005 to 3.5% of B, which comprises the first step of forming in advance a passive film with an oxidizing acid on the surface of the stainless steel product, the second step of allowing an aqueous acid solution to corrode the passive film, to thereby project one or more of a $M_{23}C_6$ type carbide, a $M_{23}(C, B)_6$ type borocarbide and $M_2B$ type boride, which are inclusions having good electroconductivity, the third step of forming a passive coating film with an oxidizing acid on the surface of the steel product except that of the inclusion above projected, and the fourth step of washing with water and drying. The method of treatment allows, without the use of a method requiring a high cost such as gold plating, the improvement in the contact resistance of the stainless steel product for a fuel cell, which results in the retention of excellent characteristics of a stainless steel product over a long period of time.

14 Claims, 4 Drawing Sheets

Change as time passed of current density at 0.7V power generation of unit cell

METHOD OF SURFACE TREATMENT FOR STAINLESS STEEL PRODUCT FOR FUEL CELL

TECHNICAL FIELD

The present invention relates to a method of surface treatment for a stainless steel product for fuel cells, and more particularly, relates to a technique of reducing the contact resistance by protruding conductive inclusions on the surface and maintaining a low contact resistance for a long period by preventing fall off of conductive inclusions.

BACKGROUND ART

For example, a separator of a fuel cell forms a reaction gas passage, and functions as a conductor for supplying an electric current generated by contacting with an electrode to the outside, and it is hence required to be low in contact resistance. Recently, from the viewpoint of strength and corrosion resistance, fuel cell separators made of stainless steel are drawing attention. Stainless steel products are superior in corrosion resistance because a passive film is formed on the surface; however, the passive film is high in electrical resistance. Accordingly, in Japanese Patent Application Laid-open (JP-A) No. 10-228914, it is proposed to reduce the electrical resistance by plating the separator contact area with gold.

In this proposal, however, because of gold plating, the separator becomes very expensive, and the manufacturing cost of the fuel cells is higher. In JP-A No. 11-121018, a separator having carbon particles buried in the surface of a stainless steel product is proposed. However, this separator easily falls off due to friction caused by vibration or the like, and is not suitable for long-term use.

DISCLOSURE OF THE INVENTION

It is hence an object of the invention to provide a method of surface treatment for stainless steel products for fuel cells which is capable of enhancing the contact resistance without resort to costly techniques such as plating, and exhibiting the superior features of stainless steel product for a long period.

The present inventors first researched surface treatment methods for protruding conductive inclusions contained in stainless steel on the surface. In this surface treatment method, limited quantities of C and B are contained in a stainless steel product to precipitate highly conductive inclusions such as carbide, boron carbide, and boron, and the surface of the stainless steel product is etched by an acidic aqueous solution to protrude the conductive inclusions on the surface, and the surface is treated with an oxidizing acid to form a passive film. According to this surface treatment method, since the conductive inclusions are protruding from the passive film, the contact resistance is lowered as the conductive inclusions act as contact points, while corrosion resistance is not sacrificed.

In such a surface treatment method, however, conductive inclusions easily fall off from the matrix, and the contact resistance increases with the passing of the time. According to the research by the inventors, reasons for such inconvenience are estimated to be as follows.

FIG. 1 is electron microscope photographs of a stainless steel product treated by this surface treatment method. The photographs show that the matrix surrounding the conductive inclusions is excavated. This is illustrated in FIG. 3, and it is found that gaps are formed around the conductive inclusions due to crevice corrosion or pitting corrosion. That is, in the surface treatment method for etching the surface with an acidic aqueous solution first, when the conductive inclusions precipitate, Cr is taken into the inner side, and the surrounding Cr concentration is diluted, and, as a result, at the time of etching with the acidic aqueous solution, Fe components and Ni components around the conductive inclusions elute selectively, and slight gaps are formed between the conductive inclusions and the matrix. Consequently, a passive film is formed on the surface of the matrix by an oxidizing acid, but crevice corrosion or pitting corrosion is initiated from the already formed slight gaps. Therefore, in this surface treatment method, the adhering strength of conductive inclusions to the matrix is weak, and they may easily fall off from the matrix due to friction during use or at the time of bending processing or the like. Even if the conductive inclusions do not fall off, the electrical resistance is increased, since the contact area between the conductive inclusions and matrix is small.

The method of surface treatment for stainless steel products for fuel cells of the invention is an improved method of such surface treatment methods, and is applied in a manufacturing method of stainless steel products for fuel cells, comprising, by weight, C: 0.15% or less, Cr: 17 to 36%, and B: 0.005 to 3.5%, which comprises a first step of forming a passive film preliminarily on the surface of the stainless steel product by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying.

Generally, on the surface of a stainless steel product, a passive film mainly composed of Cr hydroxide is formed by contact with the air in its manufacturing process, but the passive film formed on the stainless steel product surface in the air is very thin and is about several nanometers. On the other hand, the Cr concentration in the matrix around the conductive inclusions is lowered along with precipitation of inclusions, and hence a sound film as a passive film is not formed sufficiently. The inventors completed the invention by discovering that a sound passive film can be formed by repairing the region not forming a sound film as a passive film around the conductive inclusions into a sound passive film by adding an oxidizing acid at the first step, thereby forming a Cr-rich passive film. In other words, by restoring the passive film around the conductive inclusions to form a sound film in the first step, when etched in an acidic aqueous solution in the second step, the surrounding of the conductive inclusions is not selectively eluted and excavated, and gaps as the cause of crevice corrosion are hardly formed in the matrix, and the invention is completed by the determination of this fact.

Moreover, in the second step of the invention, since the Fe component and Ni component in the passive film elute preferentially, the Cr concentration in the passive film is increased, and the passive film becomes rich in Cr of higher corrosive resistance. In the third step, a passive film is further formed by an oxidizing acid, and the Cr oxide concentration becomes higher, so that the corrosion resistance may be further enhanced.

FIG. 2 is electron microscope photographs of a stainless steel product treated by the surface treatment method of the invention, and FIG. 4 is a schematic diagram showing a cross section of conductive inclusions. As is clear from these diagrams, it is known that crevice corrosion or pitting corrosion does not take place between the conductive inclusions and the matrix. Thus, according to the surface treatment method of the invention, occurrence of crevice corrosion or the like around the conductive inclusions can be prevented. Therefore, the contact area between the conductive inclusions and the matrix can be increased, and the electrical resistance can be lowered. It is also effective to prevent fall off of conductive inclusions, and a low electrical resistance can be maintained for a long period. Also in the second step, a Cr-rich passive film can be formed, and the corrosion resistance can be enhanced.

Moreover, a de-B layer is hardly formed by using a bright annealed steel material, as compared with air annealing, since it is annealed in a non-oxidizing atmosphere. As a result, it is effective to arrest decrease of conductive inclusions exposed after pickling.

BEST MODE FOR CARRYING OUT THE INVENTION

Figure 1A:
FIG. 1A and FIG. 1B are electron microscope photographs of the surface of a stainless steel product for fuel cells treated by a surface treatment method of etching the surface in an acidic aqueous solution first.
Figure 1B:
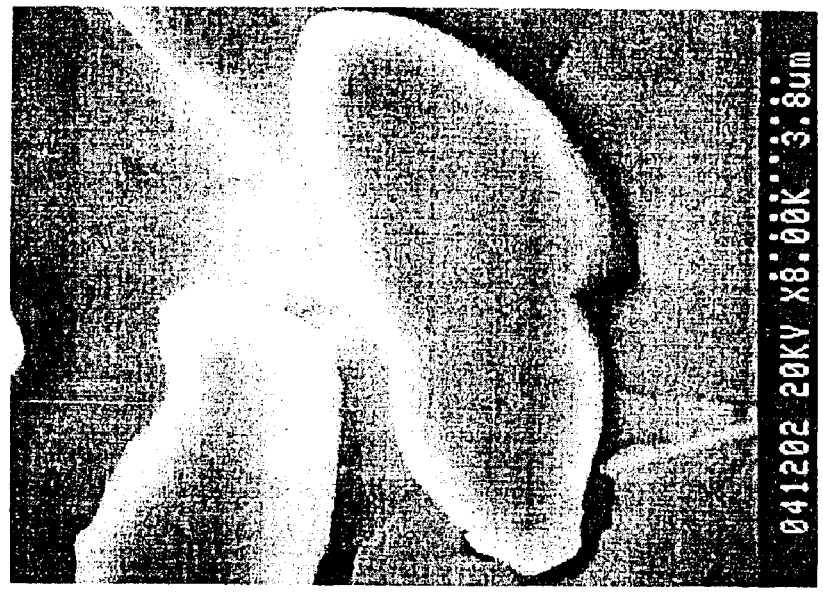
Figure 2A:
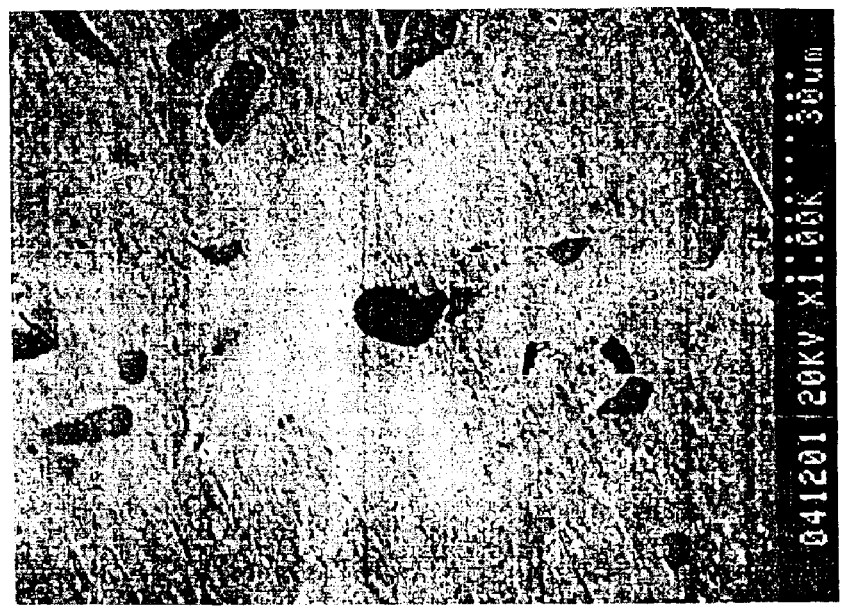
FIG. 2A and FIG. 2B are electron microscope photographs of the surface of a stainless steel product for fuel cells treated by the surface treatment method of the invention.
Figure 2B:
Figure 3:
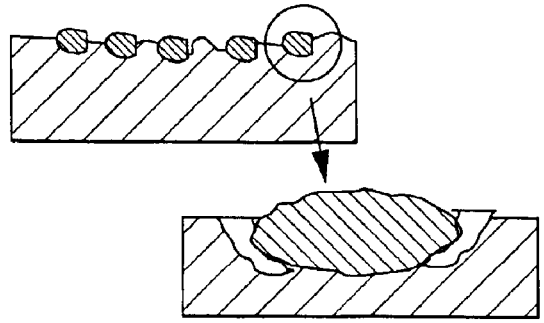
FIG. 3 is a sectional view schematically showing the conductive inclusions shown in FIG. 1.
Figure 4:
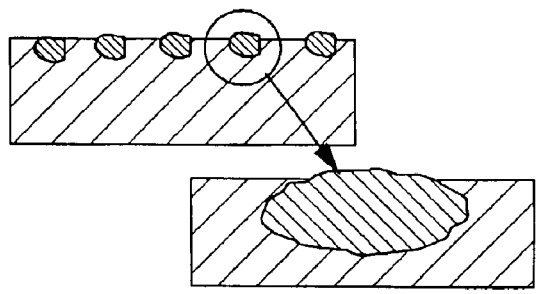
FIG. 4 is a sectional view schematically showing the conductive inclusions shown in FIG. 2.

Preferred embodiments of the invention are described below.
Austenitic Stainless Steel Product In the invention, an austenitic stainless steel product can be used. That is, a manufacturing method of a stainless steel product for fuel cells in a preferred embodiment of the invention is a surface treatment method of austenitic stainless steel products for fuel cells comprising, by weight, C: 0.15% or less, Si: 0.01 to 1.5%, Mn: 0.01 to 2.5%, P: 0.035% or less, S: 0.01% or less, Al: 0.001 to 0.2%, N: 0.3% or less, Cu: 0 to 3%, Ni: 7 to 50%, Cr: 17 to 30%, Mo: 0 to 7%, B: 0.005 to 3.5%, and balance: Fe and inevitable impurities, with the contents of Cr, Mo, and B satisfying the following formula, which comprises a first step of forming a passive film preliminarily on the surface of the austenitic stainless steel product of the specified composition by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying:

$$Cr(\%) + 3 \times Mo(\%) - 2.5 \times B(\%) \geq 17$$

wherein element symbols denote contents (wt. %).
Ferritic Stainless Steel Product In the invention, a ferritic stainless steel product can be used. That is, a manufacturing method of a stainless steel product for fuel cells in the other preferred embodiment of the invention is a method of surface treatment for ferritic stainless steel products for fuel cells comprising, by weight, C: 0.15% or less, Si: 0.01 to 1.5%, Mn: 0.01 to 1.5%, P: 0.035% or less, S: 0.01% or less, Al: 0.001 to 0.2%, N: 0.35% or less, Cu: 0 to 1%, Ni: 0 to 5%, Cr: 17 to 36%, Mo: 0 to 7%, B: 0.005 to 3.5%, and balance: Fe and inevitable impurities, with the contents of Cr, Mo, and B satisfying the following formula, which comprises a first step of forming a passive film preliminarily on the surface of the ferritic stainless steel product of the specified composition by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying:

$$Cr(\%) + 3 \times Mo(\%) - 2.5 \times B(\%) \geq 17$$

wherein element symbols denote contents (wt. %).
Conductive Inclusions

Of the $M_{23}C_6$ type carbide, $M_{23}(C, B)_6$ type boron carbide metal inclusion, and $M_2B$ type boride metal inclusion, the symbol "M" denotes a metal element, which is not a specific metal element, but is a metal element with strong chemical affinity for C or B. Generally, in relation to coexisting elements in steel, M is mainly composed of Cr and Fe, and often contains traces of Ni and Mo. In the case of carbide, B also has an action as "M". Metal inclusions of $M_{23}C_6$ type carbide include $Cr_{23}C_6$ and $(Cr, Fe)_{23}C_6$, metal inclusions of $M_{23}(C, B)_6$ type boron carbide include $Cr_{23}(C, B)_6$ and $(Cr, Fe)_{23}(C, B)_6$, and metal inclusions of $M_2B$ type boride include $Cr_{23}$, $(Cr, Fe)_{23}$, $(Cr, Fe, Ni)_2B$, $(Cr, Fe, Mo)_2B$, $(Cr, Fe, Ni, Mo)_2B$, and $Cr_{1.2}Fe_{0.76}Ni_{0.04}B$. In any one of these metal inclusions of $M_{23}C_6$ type carbide or metal inclusions of $M_2B$ type boride, metal inclusions having part of C replaced by B often precipitate, such as $M_{23}(C, B)_8$ type, $M_4(C, B)$ type, $M_2(C, B)$ type, $M(C, B)$ type carbide metal inclusions and $M_2(C, B)$ type boride metal inclusions, and these inclusions are supposed to be contained in the above expression. Basically, dispersants of metals superior in electric conductivity are expected to have similar performances.

The reasons for limiting the numerical values of the contents of the components are as follows. In the following explanation, the percentage refers to the percentage by weight.
C: 0.15% or Less C disperses and precipitates as a carbide mainly composed of Cr, and acts to lower the contact electrical resistance of the surface of a stainless steel product covered with a passive film. However, if the content of C exceeds 0.15%, the strength and hardness are raised while the ductility is lowered, and the manufacturing efficiency reduces. Hence, the content of C is defined to be at 0.15% or less.
Cr: 17 to 36%

Cr is an important element for assuring the corrosion resistance of the matrix, and its effect is insufficient if contained by less than 17%. In contrast, if the Cr content exceeds 36%, manufacture on a mass production scale is difficult. Hence, the content of Cr is defined to be within 17 to 36%. In the austenitic stainless steel, in particular, if it exceeds 30%, the austenite phase becomes unstable, and hence it is preferred to be 30% or less.

B: 0.005 to 3.5%

B precipitates as $M_{23}(C, B)_6$ type boron carbide and $M_2B$ type boride, and acts to lower the contact electrical resistance of the surface of stainless steel product covered with a passive film. Such action is insufficient if the content of B is less than 0.005%. In contrast, if the content of B exceeds 3.5%, on the other hand, it is difficult to manufacture in an ordinary melting method, and the strength and hardness become too high and the ductility drops, and hence the productivity reduces. Hence, the content of B is defined within 0.005 to 3.5%.

$$Cr(\%)+3\times Mo(\%)-2.5\times B(\%)\geq 17$$

Due to precipitation of boride and carbide of Cr, the content of Cr in the steel contributing to corrosion resistance decreases as compared with the content of Cr in the steel melting stage, and the corrosion resistance of the matrix may deteriorate. In order to assure the corrosion resistance inside the fuel cell, it is preferred that the content of Cr in the steel at least satisfy the relation in the formula above.

Si: 0.01 to 1.5%

Si, like Al, is an element for adding as an effective deoxidizer. If the content of Si is less than 0.01%, the deoxidizing action is insufficient, and if it exceeds 1.5%, the forming performance is lowered. Hence, it is preferred to contain Si in a range of 0.01 to 1.5%.

Mn: 0.01 to 2.5%

Mn has an action of fixing S in the steel as a sulfide of Mn, and also has an effect of improving the hot processing performance. In an austenitic stainless steel product, Mn contributes to stabilization of the austenite phase. On the other hand, if the content of Mn exceeds 2.5%, further effects are not expected. Hence, it is preferred to contain Mn in a range of 0.01 to 2.5%. In the case of a ferritic stainless steel product, the content of Mn is sufficient at 1.5% or less.

P: 0.035% or less

P is an impurity element, and its content is preferred to be 0.035% or less.

S: 0.01% or less

Almost S precipitates as Mn sulfide, Cr sulfide, Fe sulfide, or composite nonmetallic inclusion of their composite sulfides and oxides. Nonmetallic inclusions in any composition acts as starting points of corrosion, and is harmful for maintenance of passive film or suppression of corrosion elution. Hence, the content of S should be defined to be at 0.01% or less.

Al: 0.001 to 0.2%

Al is added in a steel melting stage as a deoxidizer. B is an element having a strong bonding powder with oxygen in molten steel, and hence the oxygen concentration must be lowered by deoxidizing with Al. Hence, it is preferred to be contained in a range of 0.001 to 0.2%.

N: 0.3% or less, or 0.035% or less

In an austenitic stainless steel product, N is an effective element for adjusting the balance of the austenite phase as an austenite forming element. However, its upper limit should be 0.3% in order not to deteriorate the processing efficiency. In a ferritic stainless steel product, on the other hand, N is an impurity. N deteriorates toughness at ordinary temperature, and hence the upper limit should be 0.035%.

Ni: 7 to 50%, or 0 to 5%

In an austenitic stainless steel product, Ni is an important alloy element for stabilizing the austenite phase. If the content of Ni is less than 7%, such action is insufficient, and if it exceeds 50%, it is difficult to manufacture. Hence, in the case of an austenitic stainless steel product, the content of Ni is preferred to be in a range of 7 to 50%.

In a ferritic stainless steel product, Ni is effective to improve the corrosion resistance and toughness. If, however, the content of Ni exceeds 5%, a two-phase texture of ferrite and austenite is formed, and directivity occurs in forming of thin plate, and sufficient processing efficiency is not obtained. Hence, in the case of a ferritic stainless steel product, the content of Ni is preferred to be in a range of 0 to 5%.

Mo: 0 to 7%

Mo is effective to improve the corrosion resistance by a smaller content than Cr. Preferably, Mo is contained at 7% or less as required. If it is contained at more than 7%, intermetallic compounds such as sigma phase, making materials brittle, are more likely to precipitate. Hence, it is preferred to contain Mo in a range of 0 to 7%.

Cu: 0 to 3%, or 0 to 1%

Cu is an austenite phase stabilizing element, and functions effectively for maintaining the passive state. If the content of Cu exceeds 3%, the hot processability is lowered, and mass production is difficult. Hence, in an austenitic stainless steel product, it is preferred to contain Cu in a range of 0 to 3%. In contrast, in a ferritic stainless steel product, Cu exhibits a similar action, but the upper limit is preferably 1%.

Meanwhile, in order to form a favorable passive film, the oxidizing acid is preferred to contain at least nitric acid at 2 to 30%. To protrude conductive inclusions securely from the passive film by etching sufficiently, the acidic aqueous solution is preferred to contain at least hydrofluoric acid at 2 to 20% and nitric acid at 5 to 20%.

As the condition of bright annealing treatment for decreasing the de-B layer forming in the surface layer, the dew point temperature of −55 to −35° C. is preferred in a non-oxidizing atmosphere. A non-oxidizing atmosphere is, for example, ammonia gas, a nitrogen-hydrogen atmosphere, or a hydrogen atmosphere, and a nitrogen-hydrogen atmosphere is particularly preferred. The annealing conditions are 1050 to 1120° C. for 20 seconds.

EXAMPLES

Referring now to exemplary embodiments, the invention is more specifically described below.

A. Preparation of Samples

An austenitic stainless steel product in the composition shown in Table 1 was melted in a vacuum melting furnace, formed into ingots, and hot rolled, cold rolled, and bright annealed for 20 seconds at 1080° C. in a nitrogen-hydrogen atmosphere, and a 0.15 mm thick sample was fabricated. This sample was immersed for 10 minutes in an oxidizing acid of a 5% nitric acid solution held at 90° C., and a passive film was formed. Consequently, the sample was immersed for 2 minutes in an acidic aqueous solution of a 10% nitric acid solution and a 4% hydrofluoric acid held at 60° C., and the sample surface was etched. This sample was further immersed for 10 minutes in an oxidizing acid of an 8% nitric acid solution held at 90° C., and a passive film was formed. The sample was finally washed in water and dried.

TABLE 1

| C | Si | Mn | P | S | Cu | Ni | Cr | Mo | Al | N | B |
|---|---|---|---|---|---|---|---|---|---|---|---|
| 0.081 | 0.50 | 0.12 | 0.014 | 0.001 | 0.30 | 8.0 | 19.1 | 0.49 | 0.08 | 0.005 | 0.60 |

By way of comparison, a same austenitic stainless steel product in the composition shown in Table 1 was treated by the surface treatment method of etching the surface by an acidic aqueous solution first initially researched by the inventors (hereinafter called the prior art). That is, an identical sample as in the embodiment of the invention was prepared, and the surface of the sample was etched by immersing this sample for 2 minutes in an acidic aqueous solution of a 10% nitric acid solution and a 4% hydrofluoric acid held at 60° C. This sample was further immersed for 10 minutes in an oxidizing acid of an 8% nitric acid solution held at 90° C., and a passive film was formed.

B. Measurement of Characteristics

Figure 5:
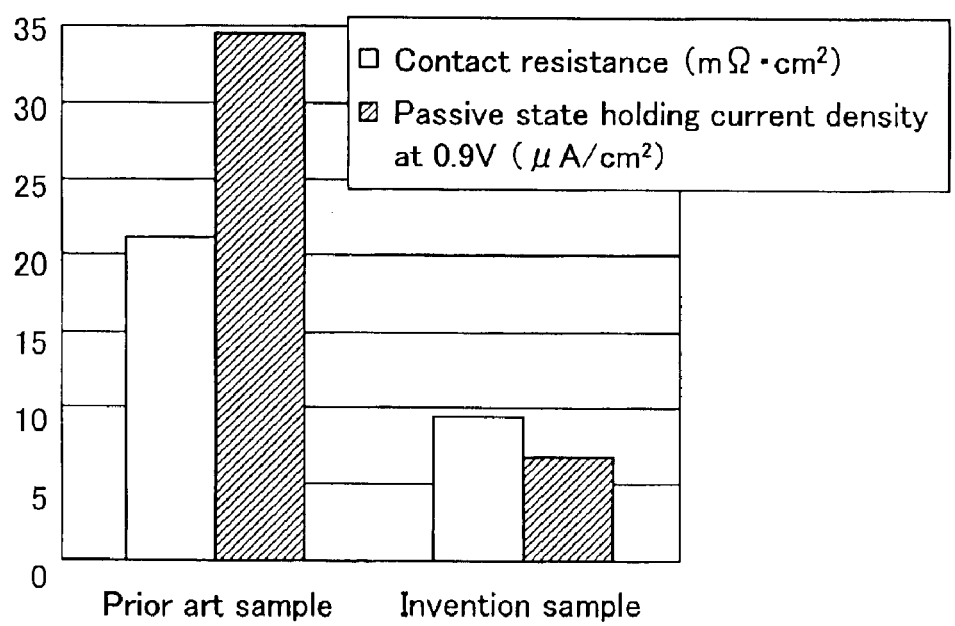
FIG. 5 is a diagram showing contact resistance and passive state holding current density at 0.9 V in an example of the invention.

In these samples, the contact resistance and passive state holding current density at 0.9 V were measured. Results of measurement are shown in FIG. 5. The contact resistance is a through-resistance measured by applying a surface load of 5 kgf/cm$^2$ on two overlaid plies of separators (anode side and cathode side) using a resistance meter. The passive state holding current density refers to the current density corresponding to the rate of corrosion when the oxide forming speed of the stainless steel of the base material becoming an oxide and the speed of the surface oxide film being melted to become ions are equalized, that is, when the thickness of the oxide film no longer changes, and this current density was measured by a constant potential polarization test. As is clear from FIG. 5, in the sample treated by the surface treatment method of the invention, the contact resistance is far smaller than in the prior art, and the passive state holding current density at 0.9 V is larger.

Figure 6:
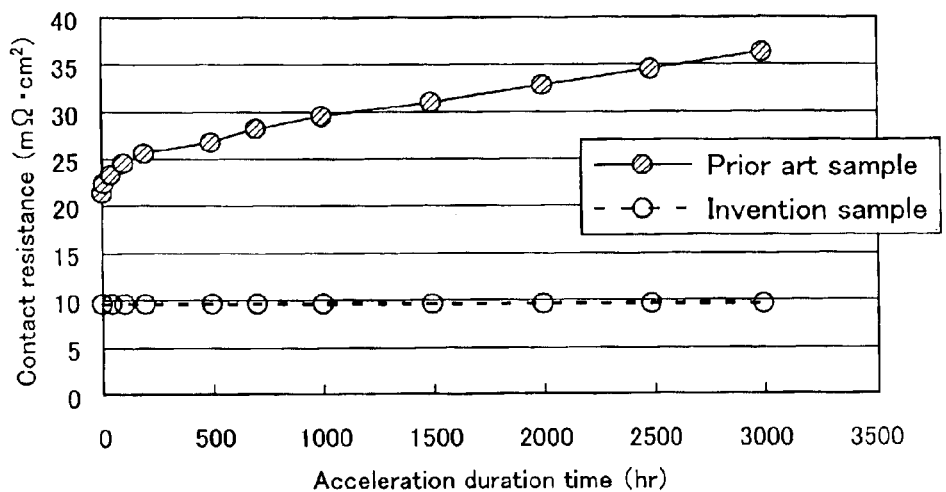
FIG. 6 is a diagram showing the relationship of acceleration duration time and contact resistance in an example of the invention.

Using this sample as separator, unit cells of fuel cell were prepared, and ten unit cells were laminated, and a fuel cell stack was fabricated. The fuel cell stack was installed in a vibration machine, and changes in contact resistance were observed in a same vibration mode (1.1 G, 30 Hz) as in an actual vehicle. Results are shown in FIG. 6. As is clear from FIG. 6, in the embodiment of the invention, the contact resistance was low, and there was no change at all up to 3000 hours. In contrast, in the prior art, the contact resistance was high and increased with the passing of time. This is because the conductive inclusions fell off due to vibration.

Figure 7:
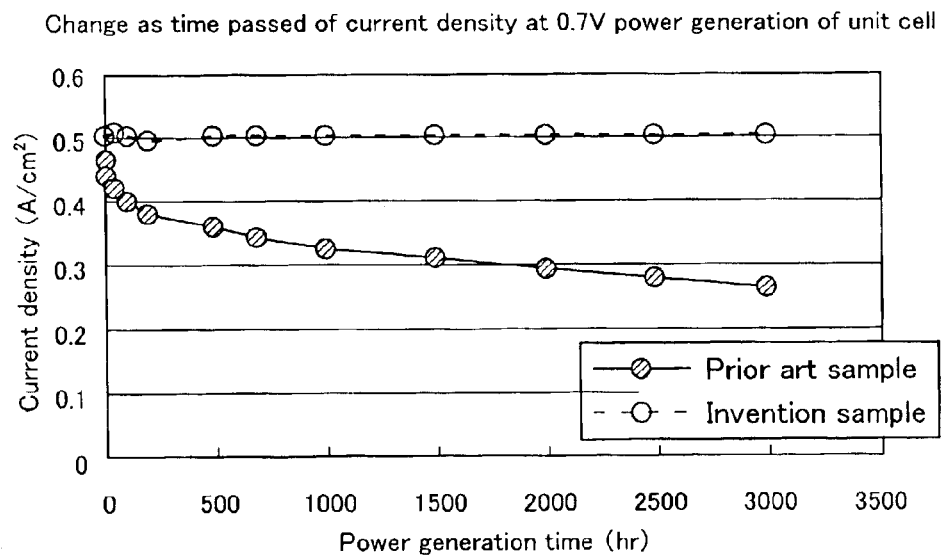
FIG. 7 is a diagram showing the relationship of power generation time and contact resistance in an example of the invention.

Using these fuel cells, power was generated, and the current density at 0.7 V power generation of unit cells was measured from start of power generation until 3000 hours. Results of measurement are shown in FIG. 7. As seen from FIG. 7, only at the start of power generation was the current density similar in the embodiment of the invention and the prior art; however, that of the prior art began to decline suddenly in current density from right after the start of power generation, and further declined gradually as time passed. It is also believed to be due to fall off of the conductive inclusions.

Using the ferritic stainless steel product shown in Table 2, samples were prepared and tested similarly, and similar results as mentioned above were obtained.

TABLE 2

| C | Si | Mn | P | S | Cu | Ni | Cr | Mo | Al | N | B |
|---|---|---|---|---|---|---|---|---|---|---|---|
| 0.081 | 0.50 | 0.12 | 0.014 | 0.001 | 0.30 | 0.54 | 19.1 | 0.49 | 0.08 | 0.005 | 0.60 |

What is claimed is:

1. A method of surface treatment for a stainless steel sheet product for fuel cells, the stainless steel sheet product being formed by a process comprising forming an ingot, hot rolling, cold rolling and annealing to yield the stainless steel sheet product, whereafter the stainless steel sheet product is subjected to a four step process, the stainless steel sheet product comprising, by weight, C: 0.15% or less, Cr: 17 to 36%, and B: 0.005 to 3.5%, the four step process comprising a first step of forming a passive film preliminarily on the surface of the stainless steel sheet product by an oxidizing acid, a second step of protruding one or more types of conductive inclusions $M_{23}C_6$ type carbide, $M_{23}(C, B)_6$ type boron carbide, and $M_2B$ type boride on the surface by etching the passive filming in an acidic aqueous solution, a third step of forming a passive film on the surface other than the inclusions protruding on the etched surface by an oxidizing acid, and a fourth step of washing in water and drying.

2. A method of surface treatment for an austenitic stainless steel sheet product for fuel cells, the austenitic stainless steel sheet product being formed by a process comprising forming an ingot, hot rolling, cold rolling and annealing to yield the stainless steel sheet products, whereafter the stainless steel sheet products is to a four step process, the austenitic stainless steel sheet product comprising, by weight, C: 0.15% or less, Si: 0.01 to 1.5%, Mn: 0.01 to 2.5%, P: 0.035% or less, S: 0.01or less, Al: 0.001 to 0.2%, N: 0.3% or less, Cu: 0 to 3%, Ni: 7 to 50%, Cr: 17 to 30%, Mo: 0 to 7%, B: 0.005 to 3.5%, and balance: Fe and inevitable impurities, with the contents of Cr, Mo, and B satisfying the following formula, Cr (%)+3×Mo (%)−2.5×B (%)≧17 wherein element symbols denote contents (wt.%), the four step process comprising a first step of forming a passive film preliminarily on the surface of the austenitic stainless steel sheet product of the specified composition by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying.

3. A method of surface treatment for a ferritic stainless steel sheet product for fuel cells, the ferritic stainless steel sheet product being formed by a process comprising forming an ingot, hot rolling, cold rolling and annealing to yield the stainless steel sheet product, whereafter the stainless steel sheet product is subjected to a four step process, the ferritic stainless steel product comprising, by weight, C: 0.15% or less, Si: 0.01 to 1.5%, Mn: 0.01 to 1.5%, P: 0.035% or less, S: 0.01% or less, Al: 0.001 to 0.2%, N: 0.35% or less, Cu: 0 to 1%, Ni: 0 to 5%, Cr: 17 to 36%, Mo: 0 to 7%, B: 0.005 to 3.5%, and balance: Fe and inevitable impurities, with the contents of Cr, Mo, and B satisfying the following formula, $$Cr (\%) + 3 \times Mo (\%) - 2.5 \times B (\%) \geq 17$$

wherein element symbols denote contents (wt.%).

the four step process comprising a first step of forming a passive film preliminarily on the surface of the ferritic stainless steel sheet product of the specified composition by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying.

4. A method of surface treatment for a bright annealed stainless steel sheet product for fuel cells, the bright annealed stainless steel sheet product being formed by a process comprising forming an ingot, hot rolling, cold rolling and annealing to yield the stainless steel sheet product, whereafter the stainless steel sheet product is subjected to a four step process, the bright annealed stainless steel sheet product comprising, by weight, C: 0.15% or less, Cr: 17 to 36%, and B: 0.005 to 3.5%, the four step process comprising a first step of forming a passive film preliminarily on the surface of the bright annealed stainless steel sheet product by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusion protruding on the etched surface by an oxidizing acid, and a fourth step of washing in water and drying.

5. A method of surface treatment for a bright annealed austenitic stainless steel sheet product for fuel cells, the bright annealed stainless steel sheet product being formed by a process comprising forming an ingot, hot rolling, cold rolling and annealing to yield the stainless steel sheet product, whereafter the stainless steel sheet product is subjected to a four step process, the bright annealed austenitic stainless steel sheet product comprising, by weight, C: 0.15% or less, Si: 0.01 to 1.5%, Mn: 0.01 to 2.5%, P: 0.35% or less, S: 0.01% or less, Al: 0.001 to 0.2%, N: 0.3% or less, Cu: 0 to 3%, Ni: 7 to 50%, Cr: 17 to 30%, Mo: 0 to 7%, B: 0.005 to 3.5%, and balance: Fe and inevitable impurities, with the contents of Cr, Mo and B satisfying the following formula, $$Cr (\%) + 3 \times Mo (\%) - 2.5 \times B (\%) \geq 17$$

wherein element symbols denote contents (wt. %).

the four step process comprising a first step of forming a passive film preliminarily on the surface of the austenitic stainless steel sheet product of the specified composition by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying.

6. A method of surface treatment for a bright annealed ferritic stainless steel sheet product for fuel cells, the bright annealed ferritic stainless steel product being formed by a process comprising forming an ingot, hot rolling, cold rolling and annealing to yield the stainless steel sheet product, whereafter the stainless steel sheet product is subjected to a four step process, the bright annealed ferritic stainless steel product for cells comprising, by weight, C: 0.15% or less, Si: 0.01 to 1.5%, Mn: 0.01 to 1.5%, P: 0.035% or less, S: 0.01% or less, Al: 0.001 to 0.2%, N: 0.35% or less, Cu: 0 to 1%, Ni: 0 to 5%, Cr: 17 to 36%, Mo: 0 to 7%, B: 0.005 to 3.5%, and balance: Fe and inevitable impurities, with the contents of Cr, Mo, and B satisfying the following formula, $$Cr (\%) + 3 \times Mo (\%) - 2.5 \times B (\%) \geq 17$$

wherein element symbols denote contents (wt.%).

the four step process comprising a first step of forming a passive film preliminarily on the surface of the ferritic stainless steel product of the specified composition by an oxidizing acid, a second step of protruding one or more types of conductive inclusions $M_{23}C_6$ type carbide, $M_{23}(C, B)_6$ type boron carbide, and $M_2B$ type boride on the surface by etching the passive film in an acidic aqueous solution, a third step of forming a passive film on the surface other than the inclusions protruding on the etched surface by an oxidizing acid, and a fourth step of washing in water and drying.

7. The method of surface treatment for a stainless steel sheet product for fuel cells of claim 1, wherein the oxidizing acid contains at least 2 to 30% of nitric acid.

8. The method of surface treatment for the stainless steel sheet product for fuel cells of claim 1, wherein the acidic aqueous solution contains at least 2 to 20% of hydrofluoric acid and 5 to 20% of nitric acid.

9. The method of surface treatment for the stainless steel sheet product for fuel cells of claim 1, wherein the oxidizing acid is nitric acid and the acid aqueous solution is a mixture of hydrofluoric acid and nitric acid.

10. The method of surface treatment for the stainless steel sheet product for fuel cells of claim 2, wherein the oxidizing acid is nitric acid and the acid aqueous solution is a mixture of hydrofluoric acid and nitric acid.

11. The method of surface treatment for the stainless steel sheet product for fuel cells of claim 3, wherein the oxidizing acid is nitric acid and the acid aqueous solution is a mixture of hydrofluoric acid and nitric acid.

12. The method of surface treatment for the stainless steel sheet product for fuel cells of claim 4, wherein the oxidizing acid is nitric acid and the acid aqueous solution is a mixture of hydrofluoric acid and nitric acid.

13. The method of surface treatment for the stainless steel sheet product for fuel cells of claim 5, wherein the oxidizing acid is nitric acid and the acid aqueous solution is a mixture of hydrofluoric acid and nitric acid.

14. The method of surface treatment for the stainless steel sheet product for fuel cells of claim 6, wherein the oxidizing acid is nitric acid and the acid aqueous solution is a mixture of hydrofluoric acid and nitric acid.

* * * * *